T. E. MURRAY.
METAL VEHICLE WHEEL.
APPLICATION FILED DEC. 2, 1915.
1,180,734.
Patented Apr. 25, 1916.
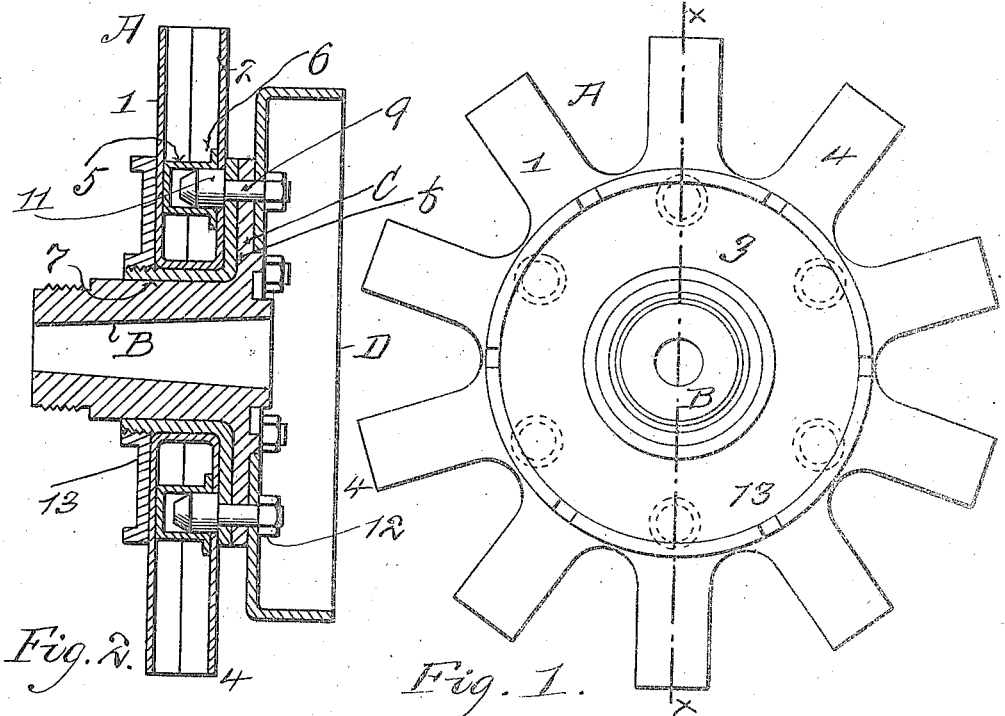
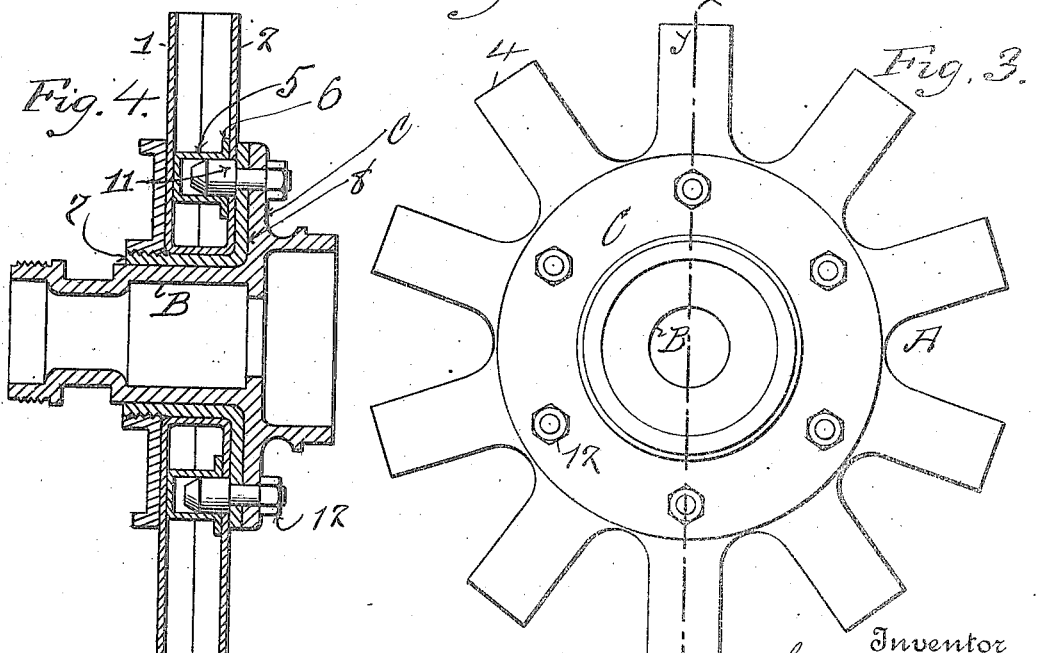
Inventor
Thomas E. Murray
By his Attorney
Carl Benjamin

UNITED STATES PATENT OFFICE.

THOMAS E. MURRAY, OF NEW YORK, N. Y.

METAL VEHICLE-WHEEL.

1,180,734.      Specification of Letters Patent.      Patented Apr. 25, 1916.

Application filed December 2, 1915. Serial No. 64,614.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention is a demountable metal wheel for vehicles, which, as a unit, can be slid off and on its supporting axle box without displacing any member except the nut which is applied to said box outside of said wheel. The construction is such that when the wheel is put in place there is a positive connection between wheel and box, so that no rotary motion of the one can occur independently of that of the other.

The object is to obviate the need of demounting automobile tires or rims on the road—the user carrying a spare wheel or spare wheels instead of spare tires or spare tires mounted on spare rims. This is now economically possible because of the cheapness with which light metal wheels may be made.

In the accompanying drawings—Figure 1 is a front elevation of my demountable wheel applied to a rear axle box. Fig. 2 is a section on the line $x$, $x$ of Fig. 1. Fig. 3 is a rear elevation of my said wheel applied to a front axle box. Fig. 4 is a section on the line $y$, $y$ of Fig. 3.

Similar letters and numbers of reference indicate like parts.

The hub A is made of sheet metal in two half sections 1 and 2, placed face to face with their edges registering, and comprises a cylindrical portion 3 and spoke bases 4 integral therewith and radiating therefrom. The spokes (not shown) are to be butt-welded to the outer ends of the bases 4. Before the hub sections 1, 2 are put together, a channeled ring 5 is welded to the inner side of section 1. After the sections are juxtaposed, flanges 6 on the circumferential edges of said ring are welded to the inner side of section 2. In section 2 and coinciding with the ring channel are a number of circular openings.

In Fig. 1, B is the rear axle box of standard form, provided with the usual flange C. On the rear side of said flange is a shoulder which enters the central opening of the brake drum D. Upon the axle box B is placed a metal ring 7, threaded near its outer end and having a flange 8, which when the ring is in place bears against flange C. The shanks of bolts 9 extend through registering openings formed in the flanges C and 8 and the wall of brake drum D. Said bolts carry or may have formed integrally with them enlarged cylindrical heads 11 which are received in the openings in hub section 2 and enter the channel of ring 5. Nuts 12 on bolts 9 bear against the inner surface of the brake disk wall, so that when said nuts are set up the flanges C and 8 and the brake disk are clamped together. A threaded nut 13 is received upon the outer portion of ring 7.

In assembling the device, the ring 7, axle box B and brake drum D are clamped together, in the manner described, by the bolts 9, the heads 11 then protruding from the outer face of ring flange 8. The sections 1, 2 of the hub A have already been united with the channeled ring 5 between them, and the remainder of the wheel (spokes and rim) is attached to the spoke bases 4. The hub A is then slid upon ring 7, the cylindrical heads 11 fitting the openings in hub section 2 and entering the channel of ring 5. Lastly, the nut 13 is applied to the threaded portion of ring 7, thus securing the wheel in place. When the device is used with a front axle box, the brake disk is, of course, absent, and the bolts 9 pass through the flanges C and 8 and are set up by the nuts 12 on the rear side of flange C, as shown in Figs. 3 and 4. The axle box in said figures is also of well known form.

It will be apparent that I have here produced a demountable wheel, which to be taken off of the axle box requires only the removal of the nut 13, and for which another and similar wheel is as easily substituted.

The heads 11 on bolts 9, which fit the openings in hub section 2, prevent any independent rotary movement of the axle box with respect to the wheel or the wheel with respect to the axle box, while at the same time permitting the wheel as a unit to be slid off or on the ring.

I prefer to use the threaded and flanged ring 7 for the reception of the wheel hub, but its presence is not essential, since obviously I can form a thread on the exterior of the axle box for the reception of nut 12, and make the wheel hub to fit on said box with hub section 2 bearing directly against the box flange C.

I claim:

1. In combination with an axle box having a circumferential flange, bolts removably secured in said flange and having enlarged heads protruding therefrom, a hollow metal wheel hub slidably mounted on said box, and a channeled ring secured within said hub, the said hub having openings receiving said heads, and the said heads extending into the channel of said ring, and a nut on said box outside of said hub for clamping said hub against said box flange.

2. In combination with an axle box having a circumferential flange and projections on said flange, a hollow metal wheel hub slidably mounted on said box, and a channeled ring secured within said hub, the said hub having openings receiving said projections, and the said projections extending into the channel of said ring, and a nut on said box outside of said hub for clamping said hub against said flange.

In testimony whereof I have affixed my signature in presence of two witnesses.

THOMAS E. MURRAY.

Witnesses:
GERTRUDE T. PORTER,
MAY T. McGARRY.